(12) United States Patent
Tan et al.

(10) Patent No.: US 7,733,477 B2
(45) Date of Patent: Jun. 8, 2010

(54) MICRO-CAVITY MEASURING EQUIPMENT AND METHOD BASED ON DOUBLE OPTICAL FIBER COUPLING

(76) Inventors: Jiubin Tan, No. 92 West Da-Zhi Street, Harbin, Heilongjiang (CN) 150001; Jiwen Cui, No. 92 West Da-Zhi Street, Harbin, Heilongjiang (CN) 150001

(*) Notice: Subject to any disclaimer, the term of this patent is extended or adjusted under 35 U.S.C. 154(b) by 165 days.

(21) Appl. No.: 11/916,861

(22) PCT Filed: Jul. 19, 2006

(86) PCT No.: PCT/CN2006/001770
§ 371 (c)(1), (2), (4) Date: Dec. 7, 2007

(87) PCT Pub. No.: WO2007/030993
PCT Pub. Date: Mar. 22, 2007

(65) Prior Publication Data
US 2008/0209746 A1  Sep. 4, 2008

(30) Foreign Application Priority Data
Sep. 14, 2005 (CN) .......................... 200510102478

(51) Int. Cl.
*G01N 21/00* (2006.01)
(52) U.S. Cl. .................... 356/241.1; 385/33; 385/46
(58) Field of Classification Search ............... 385/25, 385/35; 356/73.1, 614, 241.1
See application file for complete search history.

(56) References Cited

U.S. PATENT DOCUMENTS

| 5,434,669 A * | 7/1995 | Tabata et al. ................. 356/477 |
| 7,016,052 B2 * | 3/2006 | Bloch et al. ................. 356/601 |
| 7,023,557 B2 * | 4/2006 | VanWiggeren et al. ...... 356/477 |

* cited by examiner

*Primary Examiner*—Tarifur R. Chowdhury
*Assistant Examiner*—Isiaka O Akanbi
(74) *Attorney, Agent, or Firm*—Global IP Services; Tianhua Gu

(57) ABSTRACT

A micro-cavity measuring equipment based on double optical fiber coupling includes a sight and transmitter, a controller, and a length measuring device. The equipment detects small changes in the position of an object with respect to a probe from a moment when the sight and transmitter starts working to another moment when the sight and transmitter stops working. The controller has a program to automatically control the whole measuring process. The measuring equipment is characterized in that the sight and transmitter consists of a laser unit, a data collecting and processing unit, and a double optical fiber coupling unit with its ends of incident and effluent optical fibers fixed on a coupler. A micro-cavity measuring method based on double optical fiber coupling consists of the following steps: inserting the probe into the micro-cavity and moving it in the measuring direction; sending signals to the length measuring device by the sight and transmitter to cause the length measuring device to record the corresponding position of the probe when the probe is contact with the sides of the micro-cavity; and then calculating the dimensions of the micro-cavity.

10 Claims, 3 Drawing Sheets

Figure 1:
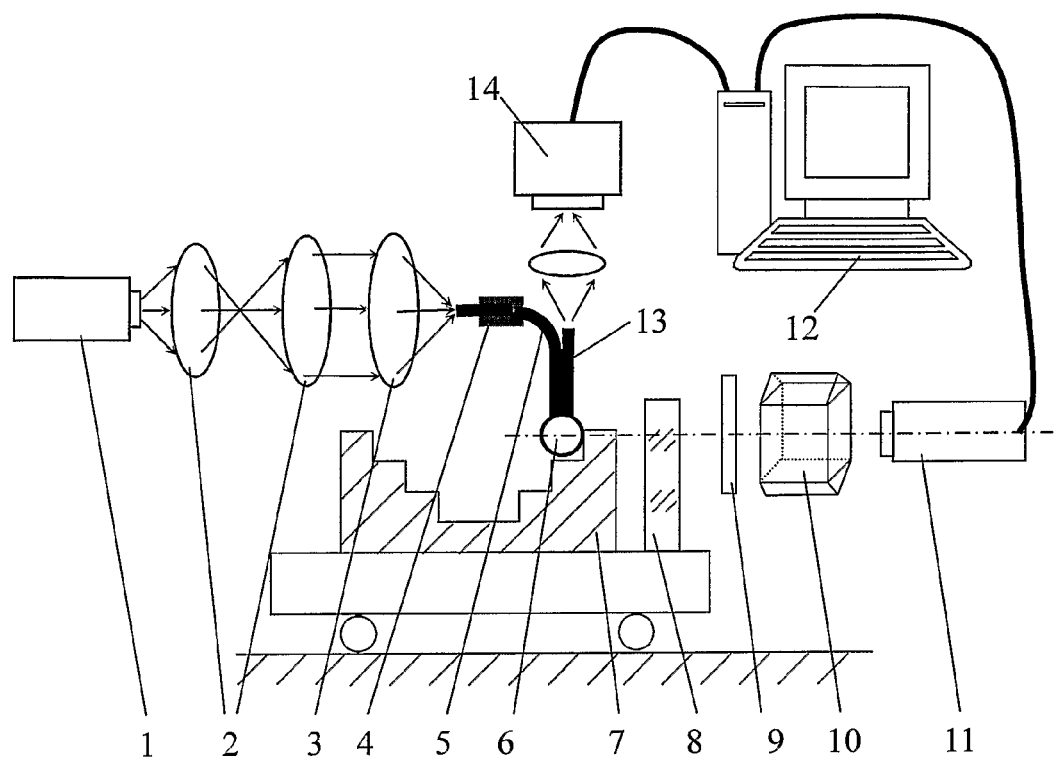

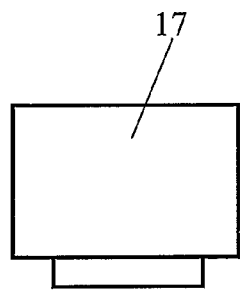 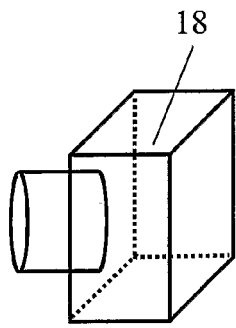 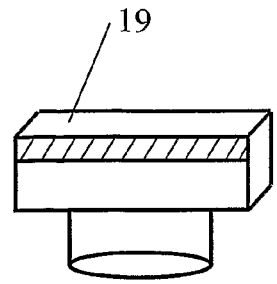
Fig.3(a)　　　　　　Fig.3(b)　　　　　　Fig.3(c)
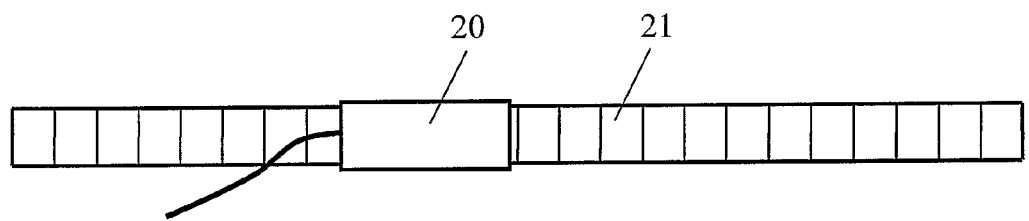
Fig.4(a)
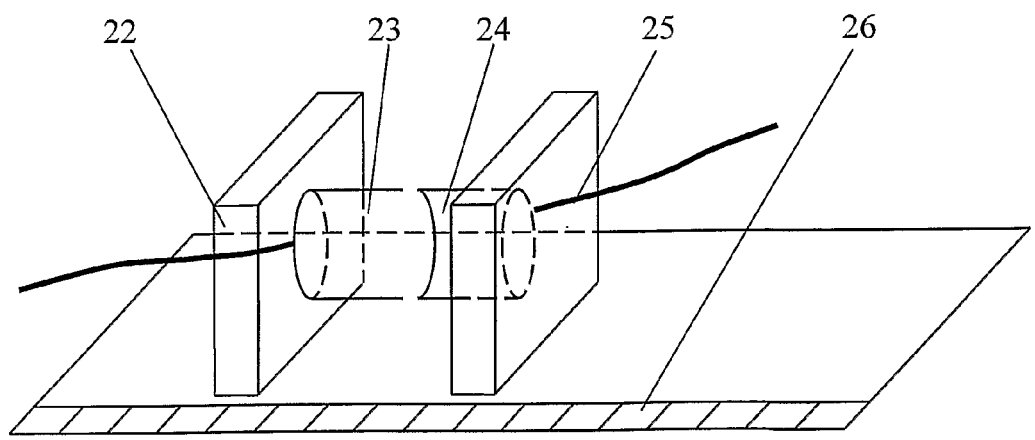
Fig.4(b)

MICRO-CAVITY MEASURING EQUIPMENT AND METHOD BASED ON DOUBLE OPTICAL FIBER COUPLING

FIELD OF THE INVENTION

This invention relates to one type of measuring equipment and method as described in claims 1 and 8 above, which can be used for measurement of irregular micro-cavities and "sub-macro" micro-cavities in particular, in addition to conventional contact measurement.

BACKGROUND OF THE INVENTION

The number of parts with micro-cavities increases with the development of hi-tech industries, such as aerospace industry, and auto industry. The proper measurement of these micro-cavities becomes a "bottleneck" for further development of these hi-tech industries, and this justifies the necessity of developing a good type of micro-cavity measuring equipment and method.

How to precisely measure the dimensions of a micro-cavity is a new problem for the measurement field and the solution of this problem involves many key techniques, and what we have to do is to minimize the conflicts among accuracy, range and depth. A wider range can be achieved at a deeper depth using a contact measuring method and a longer measurement arm, while the accuracy will decrease with the increasing length of measurement arm. Professor Zhang Guoxiong with Tianjin University invented a 3D measuring sensor with a diaphragm to solve the problem. In the 3D measuring sensor, a capacitance sensor is used to detect the distortion of the diaphragm, and an elasticity-dimension-chain is used to compensate the distortion of the diaphragm. The sensor can be used to fulfill the task of measuring a diameter of 0.2 mm, at an aspect ratio of 30:1, and an uncertainty better than 1 μm. In comparison with the contact method, non-contact optical methods can be used to fulfil the task of measuring holes of small diameter at higher accuracy, but these methods can be used to measure the surface of a hole only at a very shallow depth and cannot be used to obtain the inside information of a hole because of the bulky size of an optical system. What's more, the measurement accuracy may drop for such small defects as burrs in the hole. The vibroscanning method can be used to measure the diameter of a micro-hole by detecting the changes in voltage caused by the displacement of the probe from the wall of an object. But the measurement accuracy is subject to the influence of contaminants, and the probe may be broken for excessive vibration. So the minimum diameter and depth achievable with this method can not be large enough, even when a twin-stylus or high-aspect-ratio probe is used.

With the development of optical fiber technique, some novel methods, which use optical fibers as sensors to measure the dimensions of a micro-cavity, have been developed. However, it is almost impossible to use these methods to measure a micro-hole with a diameter of less than 1 mm.

During 1997~1998, a new measuring method, which uses a single optical fiber and a CCD image processing technique, is developed by Physikalisch-Technische Bundesanstalt (PTB) and Tianjin University. This method can be used to fulfill the task of measuring micro-cavities, in which an illuminated micro-sphere is imaged on a CCD camera as an object, and the lateral displacement of the sensor is transformed into a longitudinal displacement of the micro-sphere, and indicated in image signal brightness captured through the CCD camera. However, the image from the CCD camera is so weak that it is not suitable for image processing because most of the light enters the micro-sphere through the optical fiber can not enter the optic imaging system. Consequently the measurement depth is very shallow because of the shading effect of the wall of the micro-hole, and the method is no longer usable if the aspect-ratio is greater than 10:1. When the micro-sphere get in contact with the wall of the micro-hole, the image from the CCD camera will not be changed because the depth of field of the optical system is fixed, and so, the sensitivity and accuracy achievable with this method are not good enough, either.

SUMMARY OF THE INVENTION

Purpose of Invention

The purpose of the present invention is to propose one type of measuring equipment and method based on double optical fiber coupling for micro-cavities with vertical or tilted planes to overcome the drawbacks of the micro-cavity measuring methods now in use.

In order to attain the purpose mentioned above, the measuring equipment of this invention includes:

A sight and transmitter, which sends signals to a controller with a program to automatically control the whole measuring process, a length measuring device, which detects small changes in the position of an object with respect to the sensor from the moment when the sight and transmitter starts working to the moment when the sight and transmitter stops working. The measuring equipment features a sight and transmitter, which consists of a laser coupling unit, a data collecting and processing unit, and a double optical fiber coupling unit, with the ends of incident and effluent optical fibers fixed on a coupler.

Another purpose of this invention is to propose a micro-cavity measuring method based on double optical fiber coupling, which consists of the following measuring steps:

Step 1. The probe is inserted into the micro-cavity and moved to one side of the micro-cavity in the measuring direction;

Step 2. The probe is checked to see if it is in positive contact with one side of the micro-cavity. If the probe is not in positive contact with one side of cavity, the measuring process starts from step 1 again;

Step 3. When the probe is in positive contact with one side of the micro-cavity, the sight and transmitter sends a signal to the length measuring device to cause it to record the position of the probe as $p_1$;

Step 4. The controller causes the probe to move in a direction opposite to the measuring direction;

Step 5. The probe is checked to see if it is in positive contact with the other side of micro-cavity in opposite direction. If the probe is not in positive contact with the other side of micro-cavity, the measuring process starts from step 4 again;

Step 6. When the probe is in positive contact with the other side of the micro-cavity, the sight and transmitter sends a signal to the length measuring device to cause it to record the position of the probe as $p_2$;

Step 7. The dimensions of the micro-cavity can be calculated using formula $L=|p_1-p_2|+d_0$, where $d_0$ is the diameter of the probe.

The third purpose of this invention is to propose one micro-hole cross section roundness measuring method based on double optical fiber coupling, which consists of the following measuring steps:

Step 1. Adjust the position of the micro-hole with respect to the worktable to achieve a permissible eccentricity between the center of micro-hole and the rotation center of the worktable;

Step 2. Adjust the position of the micro-hole with respect to the probe to locate the probe at the cross section to be measured in the micro-hole, and then record the position of the micro-hole before rotation as $r_{p0}$ and the position of effluent optical fiber end surface in the sensor as $p_{00}$;

Step 3. The probe is checked to see if it is in positive contact with the wall of the micro-hole. Record the position of effluent optical fiber end plane in the sensor as $p_{01}$ if the probe is in positive contact with the wall of the micro-hole;

Step 4. After the controller moves the probe away from the wall of the micro-hole, the position of the effluent optical fiber end plane in the sensor is recorded as $p_{10}$;

Step 5. The worktable is rotated through rotational angle $r_{p1}$. After the probe is in positive contact with the wall of the micro-hole, the position of effluent optical fiber end plane in the sensor is recorded as $p_{11}$;

Step 6. The steps mentioned above are repeated until the measurement of the whole circumference is completed. Then one estimation method, such as LSE, MCE, is used to estimate the roundness of the micro-hole measured.

The fourth purpose of the invention is to propose one micro-cylinder cylindrically measuring method based on double optical fiber coupling, which consists of the following measuring steps:

Step 1. Adjust the position of the micro-hole with respect to the worktable to achieve a permissible eccentricity between the center of the micro-hole and the rotation center of the worktable;

Step 2. Adjust the position of the micro-hole with respect to the probe to locate the probe at the cross section to be measured in the micro-hole, and then record the position of the micro-hole before rotation as $r_{p0}$ and the position of effluent optical fiber end surface in the sensor as $p_{00}$;

Step 3. The probe is checked to see if it is in positive contact with the wall of the micro-hole. Record the position of effluent optical fiber end plane in the sensor as $p_{01}$ if the probe is in positive contact with the wall of the micro-hole. After the controller moves the probe away from the wall of the micro-hole, the position of the effluent optical fiber end plane in the sensor is recorded as $p_{10}$;

Step 4. The worktable is rotated through rotational angle $r_{p1}$. After the probe is in positive contact with the wall of the micro-hole, the position of effluent optical fiber end plane in the sensor is recorded as $p_{11}$;

step 5. The steps mentioned above are repeated until the measurement of all the cross sections of the micro-cylinder is completed. Then one estimation method, such as LSE, MCE, is used to estimate the cylindricity of the micro-cylinder measured.

The fifth purpose of the invention is to propose one measuring method to measure the relative position of different parts of an object based on double optical fiber coupling, which consists of the following measuring steps:

step 1. Adjust the position of the object with respect to the worktable to achieve a permissible eccentricity between the center of the object and the rotation center of the worktable;

step 2. Adjust the position of the object with respect to the probe to locate the probe at the cross section to be measured in the cavity of the object, and then record the position of the cavity before rotation as $r_{p0}$ and the position of effluent optical fiber end surface in the sensor as $p_{00}$;

step 3. The probe is checked to see if it is in positive contact with the wall of the cavity. Record the position of effluent optical fiber end plane in the sensor as $p_{01}$ if the probe is in positive contact with the wall of the cavity; after the controller moves the probe away from the wall of the cavity, the position of effluent optical fiber end plane in the sensor is recorded as $p_{10}$;

step 4. The worktable is rotated through rotational angle $r_{p1}$. After the probe is in positive contact with the wall of the cavity, the position of the effluent optical fiber end plane in the sensor is recorded as $p_{11}$;

step 5. The steps mentioned above are repeated until all the measurements are completed as required. Then the software will process the information and present the relative positions.

The measurement process consists of sighting and measuring to detect small changes in the position of an object with respect to the probe from the moment when the sight and transmitter starts working to the moment when the sight and transmitter stops working. The controller has a program to automatically control the whole measuring process.

In this invention, the reflected light signal can be enhanced through the effluent optical fiber, the minimum dimension of a micro-cavity to be measured can go up to 0.01 mm for the limit imposed by the optical fiber core, and the measuring depth aspect ratio is up to 50:1 because of the use of the sight and transmitter with double optical fiber coupling and associated length measurement device.

Another advantage of the measuring equipment is that the signals from CCD camera is the changes in position of the light spot when the double optical fiber coupling unit gets in contact with the wall of a micro-cavity, so the invention can be used to measure the vertical or tilted wall of an object.

And what's more, the measuring equipment can independently be used in other equipments, for example, a coordinate measuring machine. The equipment can be used together with other equipments to fulfill the task of measuring micro-cavities and the positions of micro-cavities in a particular part or compound.

BRIEF DESCRIPTION OF THE DRAWINGS IN THE DRAWINGS

Figures 2A, 2B:
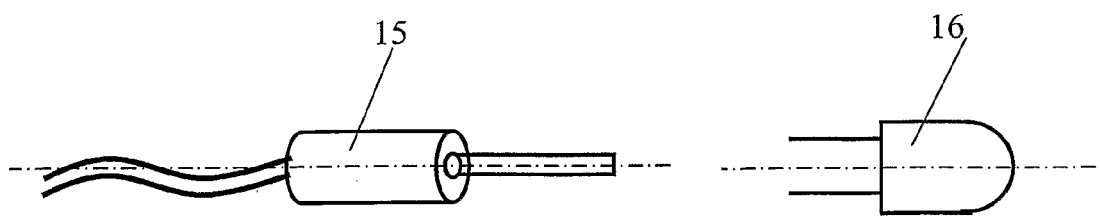
Figure 4C:
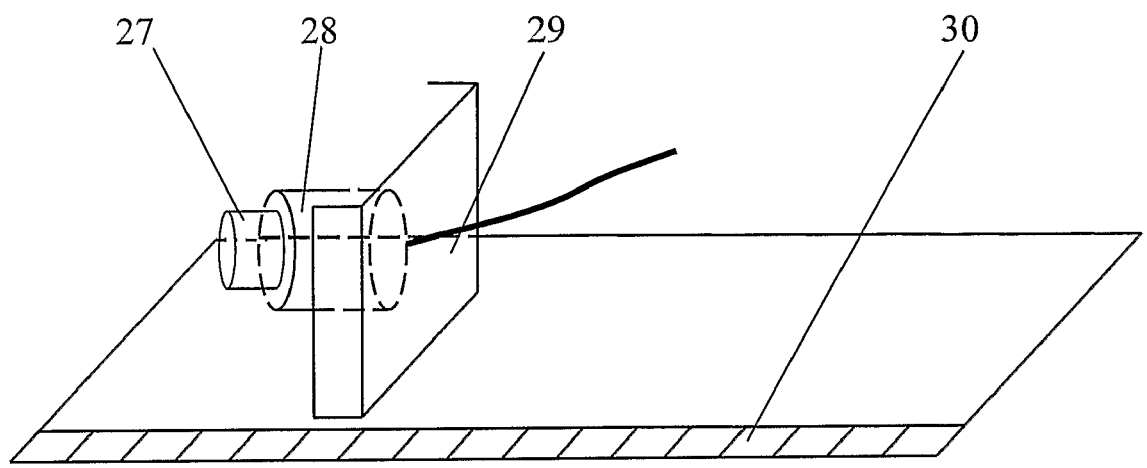
Figure 5:
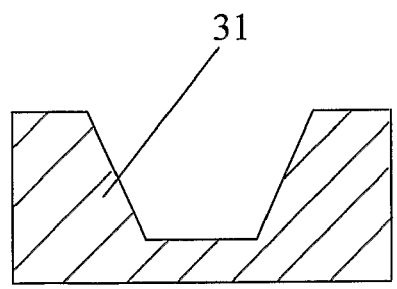

FIG. 1: construction of measuring equipment based on double optical fiber coupling;

FIG. 2(a): block diagram of laser used in laser coupling unit in sight and transmitter;

FIG. 2(b): block diagram of LED used in laser coupling unit in sight and transmitter;

FIG. 3(a): block diagram of CCD camera in sight and transmitter;

FIG. 3(b): block diagram of CMOS camera in sight and transmitter;

FIG. 3(c): block diagram of PSD sensor in sight and transmitter;

FIG. 4(a): schematic diagram of linear grating in length measuring device;

FIG. 4(b): schematic diagram of capacitance sensor with macro and micro combinations for different ranges;

FIG. 4(c): schematic diagram of inductance sensor with macro and micro combinations for different ranges;

FIG. 5: profile of tilted inner wall of micro-cavity.

DETAIL DESCRIPTION OF THE INVENTION

As shown in FIGS. 1~4, the measuring equipment consists of laser (1), beam collimator and enlarger (2), optical fiber coupling lens (3), fixing block (4), incident optical fiber (5), coupler (6), worktable (7), reflector (8), λ/4 wave slice (9), polarized beam splitter (10), double frequency laser interferometer (11), computer (12), effluent optical fiber (13), and CCD camera (14). The laser coupling unit consists of laser (1), beam collimator and enlarger (2), optical fiber coupling lens (3), and fixing block (4), and in which, laser (1), beam collimator and enlarger (2), optical fiber coupling lens (3), and one end of incident optical fiber (5) are coaxial. The double optical fiber coupling unit consists of incident optical fiber (5) in the form of an orthogonal arc, coupler (6), and effluent optical fiber (13) in the form of a straight line, and the ends of incident and effluent optical fibers are fixed on coupler (6) while the other ends are coplanar. Coupler (6) is used as both the light energy transformer and the sighting point for the measurement, and its spatial position in the micro-cavity can be detected by an opto-electronic device and the signal is processed by the data collecting and processing unit.

Data collecting and processing unit consists of lens (14A) and CCD camera (14), and in which, lens (14A), CCD camera (14), and effluent optical fiber (13) are coaxial.

The length measuring device consists of reflector (8), $\lambda/4$ wave slice (9), polarized beam splitter (10), and double frequency interferometer (11), and in which, $\lambda/4$ wave slice (9), polarized beam splitter (10), and double frequency interferometer (1) are coaxial, reflector (8) and the measured object are fixed on worktable (7), and double frequency interferometer (11) is connected with computer (12). When double frequency interferometer (11) receives the start signal from the controller, it will record the position of the probe as $p_1$, and when it receives the stop signal from the controller device, it will record the position of the probe as $p_2$.

Computer (12) consists of controlling device (121) and data processor device (122), and in which, controlling device (121) receives the image from CCD camera (14), sends start or stop signal to the length measuring device depending on the integrity of the image, and data process device (122) will calculate the data from the length measuring device.

There is no relative movement between reflector (8) and coupler (6) in the measuring direction. The light beam coming out from laser (1) goes through beam collimator and enlarger (2), focuses in optical coupling lens (3), enters coupler (6) through incident optical fiber (5), comes out through effluent optical fiber (13), and is then transformed into an electronic signal through CCD camera (14). The electronic signal is put into computer (12) and processed to attain the spatial position of coupler (6). The sight and transmitter sends a start signal to the controller to control the operation of the length measuring device when coupler (6) gets in positive contact with the wall of a micro-cavity. The length measuring device consists of reflector (8), $\lambda/4$ wave slice (9), polarized beam splitter (10), and double frequency interferometer (11), and the measurements acquired through the length measuring device are directly put into computer (12).

In this invention, the sight and transmitter detects the spatial position of the probe in the micro-cavity in real-time, and sends a signal to the controller to cause the length measuring device to start or stop working. When the probe gets in positive contact with one side of a micro-cavity, the sight and transmitter sends a signal to the length measuring device to cause it to start working and record the position of the probe as $p_1$. Then the probe is moved to the other side of the micro-cavity, and its displacement in measuring direction is detected by the length measuring device in real-time, and its position inside the micro-cavity is detected by the sight and transmitter in real-time. When the probe gets in positive contact with the other side of the micro-cavity, the sight and transmitter sends another signal to the length measuring device to cause it to stop working and record the position of the probe as $p_2$. The sectional dimensions of the micro-cavity equals to the sum of the diameter of the probe and the probe displacements detected in the micro-cavity by the length measuring device. The measuring process will continue until the measurement of all sectional dimensions of the micro-cavity is completed. The controller has a program to automatically control the whole measuring process.

The measuring steps will be the same as mentioned above if what is to be measured is the diameter of a micro-hole, except maximum $\Delta_{max}$ has to be obtained as shown below:

The probe is inserted into one cross-section of the micro-hole, and the sight and transmitter sends a start signal to the length measuring device to cause it to start working and record the position of the probe as $p_1$ when the probe is in positive contact with one side of the micro-hole. Then the controller causes the probe to move to the other side of the micro-hole in the measuring direction, and the sight and transmitter sends a stop signal to the length measuring device to cause it to stop working and record the position of the probe as $p_{21}$ when the probe is in positive contact with the other side of the micro-hole, and the relative displacement between the probe and the micro-hole can be calculated using formula $\Delta_1=|p_1-p_{21}|$. Then the micro-hole is moved in a direction vertical to the measuring direction in the plane being measured, and the probe is then moved to achieve a positive contact with the micro-hole. The sight and transmitter sends a stop signal to the length measuring device to cause it to stop working and record the position of the probe as $p_{22}$, and the relative displacement between the probe and the micro-hole can be calculated using formula $\Delta_2=|p_1-p_{22}|$. The measuring process will be continued until the maximum $\Delta_{max}$ is obtained, and the diameter of the micro-hole is calculated using formula $d=\Delta_{max}+d_0$.

The measurement steps will be the same as mentioned above if what is to be measured is the width of a micro-groove except minimum $\Delta_{min}$ has to be obtained as shown below:

The probe is inserted into one cross-section of the groove, and the sight and transmitter sends a start signal to the length measuring device to cause it to start working and record the position of the probe as $p_1$ when the probe is in positive contact with one side of the groove. Then the controller causes the probe to move to the other side of the groove in the measuring direction, and the sight and transmitter sends a stop signal to the length measuring device to cause it to stop working and record the position of the probe as $p_{21}$ when the probe is in positive contact with the other side of the groove, and the relative displacement between the probe and the groove can be calculated using formula $\Delta_1=|p_1-p_{21}|$. Then the groove is moved in a direction vertical to the measuring direction in the plane being measured, and the probe is then moved to achieve a positive contact with the groove. The sight and transmitter sends a stop signal to the length measuring device to cause it to stop working and record the position of the probe as $p_{22}$, and the relative displacement between the probe and the groove can be calculated using formula $\Delta_2=|p_1-p_{22}|$. The measuring process will be continued until the minimum $\Delta_{min}$ is obtained, and the width of the groove is calculated using formula $L=\Delta_{min}+d_0$.

The measurement steps will be the same as mentioned above if what is to be measured is the roundness of a micro-hole except for coordinate positions and one estimation method to be selected as detailed below:

Adjust the position of the micro-hole with respect to the worktable to achieve a permissible eccentricity between the center of the micro-hole and the rotation center of the worktable, then adjust the position of the micro-hole with respect to the probe to locate the probe at the cross section to be measured in the micro-hole, and then record the position of the micro-hole before rotation as $r_{p0}$ and the position of effluent optical fiber end surface in the sensor as $p_{00}$. And the probe is checked to see if it is in positive contact with the wall of the cavity. Record the position of effluent optical fiber end plane in the sensor as $p_{01}$ if the probe is in positive contact with the wall of the micro-hole. Then the controller moves the probe away from the wall of the micro-hole, the position of the effluent optical fiber end plane in the sensor is recorded as $p_{10}$, and the worktable is rotated through rotational angle $r_{p1}$. After the probe is in positive contact with the wall of micro-hole, the position of the effluent optical fiber end plane in the sensor is recorded as $p_{11}$. The steps mentioned above are repeated until the measurement of the whole circumference is completed. Then one estimation method, such as LSE, MCE, is used to estimate the roundness of the micro-hole measured.

The measurement steps will be the same as mentioned above if what to be measured is the cylindricity of a micro-hole. After the measurement of one section is completed, the vertical position of the section is recorded at the same time. When the measurement of all the cross sections is completed, one estimation method, such as LSE, MCE, is used to estimate the cylindricity of the micro-hole.

The measurement steps for a particular place will be the same as those mentioned above if what to be measured is the relative position of a particular part of an object. Upon completion of all the measurements on the object, the interrelationship between the different measurements is recorded at the same time. And while all the measurements are made, the software will process the information and present the results.

The diameter of a rotating body can be measured by one of the three other measuring methods stored in the software of this invention selected as appropriate to the measurement made: 1) the coordinate position of arbitrarily selected three points on the rotating body; 2) length of two parallel chords and distance between them; 3) fitting sampled coordinate points on the rotating body.

The dimensions and positions of a micro-cavity can be measured following the same steps as these mentioned above when the measuring equipment is used independently in other measuring equipment, for example, a coordinate measuring machine. The measurements of the micro-cavity will be read out through other measuring equipment.

This invention can be realized in way 1:

The construction of the measuring equipment is as shown in FIG. 1. The light beam coming out from laser (1) goes through beam collimator and enlarger (2), focuses through optical coupling lens (3), enters coupler (6) through incident optical fiber (5), comes out through effluent optical fiber (13), and is then transformed into an electronic signal through CCD camera (14). The electronic signal is put into computer (12) and processed to attain the spatial position of the probe. When the probe is in positive contact with the wall of the micro-cavity, the sight and transmitter sends a start signal to the controller and the controller causes the length measuring device to start working. The length measuring device consists of reflector (8), $\lambda/4$ wave slice (9), polarized beam splitter (10), and double frequency interferometer (11). The measurements by the length measuring device are directly put into computer (12) where the data is processed. The controller has a program to automatically control the whole measuring process. The light source of the double optical fiber coupling system is laser (15).

This invention can be realized in way 2:

The construction of the measuring equipment is as shown in FIG. 1. The light beam coming out from laser (1) goes through beam collimator and enlarger (2), focuses through optical coupling lens (3), enters coupler (6) through incident optical fiber (5), comes out through effluent optical fiber (13), and is then transformed into an electronic signal through CCD camera (14). The electronic signal is put into computer (12) and processed to attain the spatial position of the probe. When the probe is in positive contact with the wall of the micro-cavity, the sight and transmitter sends a start signal to the controller and the controller causes the length measuring device to start working. The length measuring device consists of reflector (8), $\lambda/4$ wave slice (9), polarized beam splitter (10), and double frequency interferometer (11). The measurements by the length measuring device are directly put into computer (12) where the data is processed. The controller has a program to automatically control the whole measuring process. The light source of the double optical fiber coupling system is LED (16).

This invention can be realized in way 3:

The construction of the measuring equipment is as shown in FIG. 1. The light beam coming out from laser (1) goes through beam collimator and enlarger (2), focuses through optical coupling lens (3), enters coupler (6) through incident optical fiber (5), comes out through effluent optical fiber (13), and is then transformed into an electronic signal through CCD camera (14). The electronic signal is put into computer (12) and processed to attain the spatial position of the probe. When the probe is in positive contact with the wall of the micro-cavity, the sight and transmitter sends a start signal to the controller and the controller causes the length measuring device to start working. The length measuring device consists of reflector (8), $\lambda/4$ wave slice (9), polarized beam splitter (10), and double frequency interferometer (11). The measurements by the length measuring device are directly put into computer (12) where the data is processed. The controller has a program to automatically control the whole measuring process. The photoconductive device of the double optical fiber coupling system is CCD camera (17).

This invention can be realized in way 4:

The construction of the measuring equipment is as shown in FIG. 1. The light beam coming out from laser (1) goes through beam collimator and enlarger (2), focuses through optical coupling lens (3), enters coupler (6) through incident optical fiber (5), comes out through effluent optical fiber (13), and is then transformed into an electronic signal through CCD camera (14). The electronic signal is put into computer (12) and processed to attain the spatial position of the probe. When the probe is in positive contact with the wall of the micro-cavity, the sight and transmitter sends a start signal to the controller and the controller causes the length measuring device to start working. The length measuring device consists of reflector (8), $\lambda/4$ wave slice (9), polarized beam splitter (10), and double frequency interferometer (11). The measurements by the length measuring device are directly put into computer (12) where the data is processed. The controller has a program to automatically control the whole measuring process. The photoconductive device of the double optical fiber coupling system is CMOS camera (18).

This invention can be realized in way 5:

The construction of the measuring equipment is as shown in FIG. 1. The light beam coming out from laser (1) goes through beam collimator and enlarger (2), focuses through optical coupling lens (3), enters coupler (6) through incident optical fiber (5), comes out through effluent optical fiber (13), and is then transformed into an electronic signal through CCD camera (14). The electronic signal is put into computer (12) and processed to attain the spatial position of the probe. When the probe is in positive contact with the wall of the micro-cavity, the sight and transmitter sends a start signal to the controller and the controller causes the length measuring device to start working. The length measuring device consists of reflector (8), λ/4 wave slice (9), polarized beam splitter (10), and double frequency interferometer (11). The measurements by the length measuring device are directly put into computer (12) where the data is processed. The controller has a program to automatically control the whole measuring process. The photoconductive device of the double optical fiber coupling system is PSD sensor (19).

This invention can be realized in way 6:

The construction of the measuring equipment is as shown in FIG. 1. The light beam coming out from laser (1) goes through beam collimator and enlarger (2), focuses through optical coupling lens (3), enters coupler (6) through incident optical fiber (5), comes out through effluent optical fiber (13), and is then transformed into an electronic signal through CCD camera (14). The electronic signal is put into computer (12) and processed to attain the spatial position of the probe. When the probe is in positive contact with the wall of the micro-cavity, the sight and transmitter sends a start signal to the controller and the controller causes the length measuring device to start working. The length measuring device consists of reflector (8), λ/4 wave slice (9), polarized beam splitter (10), and double frequency interferometer (11). The measurements by the length measuring device are directly put into computer (12) where the data is processed. The controller has a program to automatically control the whole measuring process. The linear grating in the length measuring device is as shown in FIG. 4 (*a*), and there is no relative movement between movable grating (20) and the probe.

This invention can be realized in way 7:

The construction of the measuring equipment is as shown in FIG. 1. The light beam coming out from laser (1) goes through beam collimator and enlarger (2), focuses through optical coupling lens (3), enters coupler (6) through incident optical fiber (5), comes out through effluent optical fiber (13), and is then transformed into an electronic signal through CCD camera (14). The electronic signal is put into computer (12) and processed to attain the spatial position of the probe. When the probe is in positive contact with the wall of the micro-cavity, the sight and transmitter sends a start signal to the controller and the controller causes the length measuring device to start working. The length measuring device consists of reflector (8), λ/4 wave slice (9), polarized beam splitter (10), and double frequency interferometer (11). The measurements by the length measuring device are directly put into computer (12) where the data is processed. The controller has a program to automatically control the whole measuring process. The capacitance sensor with macro and micro position combination for different ranges is as shown in FIG. 4 (*b*). The moveable block of the capacitance sensor, on which fixed block (22) and polar plate (23) are placed, and the immovable block of the capacitance sensor, on which fixed block (25) and polar plate (24) are placed, are both positioned on measuring block (26) for large range measurement, and there is a relative movement between the moveable and immovable blocks.

This invention can be realized in way 8:

The construction of the measuring equipment is as shown in FIG. 1. The light beam coming out from laser (1) goes through beam collimator and enlarger (2), focuses through optical coupling lens (3), enters coupler (6) through incident optical fiber (5), comes out through effluent optical fiber (13), and is then transformed into an electronic signal through CCD camera (14). The electronic signal is put into computer (12) and processed to attain the spatial position of the probe. When the probe is in positive contact with the wall of the micro-cavity, the sight and transmitter sends a start signal to the controller and the controller causes the length measuring device to start working. The length measuring device consists of reflector (8), λ/4 wave slice (9), polarized beam splitter (10), and double frequency interferometer (11). The measurements by the length measuring device are directly put into computer (12) where the data is processed. The controller has a program to automatically control the whole measuring process. The inductance sensor with macro and micro position combination for different ranges is as shown in FIG. 4(*c*), where installing and clamping object (28) and gauge head (27) of inductance sensor are placed on fixing object (29), and fixing object (29) is positioned in measuring part (30) for large range measurement.

The light source laser can be replaced by LED or any other energy concentrating illuminant as appropriate to the shape of the object and the measuring accuracy required.

The two-lens enlarger and collimator can be replaced by a self-focusing lens coupler or any device without enlargement and collimation as required.

The CCD camera can be replaced by a CMOS camera or PSD position sensor as an opto-electronic device in the data collecting and processing unit.

The double frequency interferometer in the length measurement device can be replaced by a linear grating, magnetic grid, capacitance grid, capacitance sensor with macro and micro combination for different measuring ranges, induction sensor with macro and micro combination for different measuring ranges, and other length measuring device.

The air-borne linear reference in this invention can be replaced by a friction wheel, precision lead screw, and other precision linear movable entity.

The air-borne worktable in rotation reference in this invention can be replaced by a worktable with precision ball bearing worktable or other precision worktables.

The circular grating can be replaced by a synchronous inducer or other high precision coders as a detection device for the rotation reference.

In addition, the geometries of a micro-cavity can be a conical surface as shown as FIG. 5, which can be measured using the measuring equipment and the measuring method and taking the same steps as those taken for measurement of the vertical wall of a micro-cavity.

What is claimed is:

1. A micro-cavity measuring equipment based on double optical fiber coupling comprising:
   a combination of a sight and transmitter;
   a controller; and
   a length measuring device for detecting a small changes in a position of an object with respect to a probe from the moment when the sight and transmitter starting work to the moment when the sight and transmitter stopping work; wherein
   said combination of sight and transmitter comprising:
      a laser coupling unit,
      a data collecting and processing unit, and
      a double optical fiber coupling unit which includes:
         a coupler for getting in positive contact with one side of a micro-cavity to trigger the length measuring device,
         an incident optical fiber for conducting focused light through to the coupler, and
         an effluent optical fiber for conducting the focused light out to the sight and transmitter where an electronic signal is attained corresponding to the focused light.

2. The micro-cavity measuring equipment of claim 1, wherein said incident optical fiber being in a form of an orthogonal arc and said effluent optical fiber being in a form of a straight line, other ends of said incident and said effluent optical fiber are coplanar with each other.

3. The micro-cavity measuring equipment of claim 1, wherein said length measuring device is a capacitance sensor with macro and micro combination for different measuring ranges.

4. The micro-cavity measuring equipment of claim 1, wherein said length measuring device is an inductance sensor with macro and micro combination for different measuring ranges.

5. The micro-cavity measuring equipment of claim 1, wherein said laser coupling unit comprises a laser, a beam collimator and enlarger, an optical fiber coupling lens, and a fixing block, said laser, collimator and enlarger, optical fiber coupling lens are coaxial with one end of said incident optical fiber, while the other end of said incident optical fiber is fixed on said fixing block;

said data collecting and processing unit comprises a lens, and a CCD camera, both are coaxial with the end of said effluent optical fiber;

upon the integrity of an image received from said CCD camera, said controller is for sending a start or stop signal for collecting data to a double frequency laser interferometer, the data processing unit is for processing the collected data;

said length measuring device comprises a reflector, a $\lambda/4$ wave slice, a polarized beam splitter, and the double frequency laser interferometer, all of them are coaxial with each other and fixed on a worktable, the double frequency interferometer is connected with a computer, when the double frequency interferometer receives the start or stop signal from the controller, the position of a probe is recorded as $p_1$ or $p_2$.

6. The micro-cavity measuring equipment of claim 5, wherein the laser is replaceable by LED.

7. The micro-cavity measuring equipment of claim 5, wherein optoelectronic parts in the data collecting and the processing unit are replaceable by PSD sensor.

8. The micro-cavity measuring method by the device of claim 1 comprising the following steps:

1), a probe is inserted into the micro-cavity and then moved to one side of the micro-cavity in the measuring direction;

2), the probe is checked to see if it is in positive contact with one side of the micro-cavity, if the probe is not in positive contact with one side of cavity, the measuring process starts from step 1 again;

3), when the probe is in positive contact with one side of the micro-cavity, a sight and transmitter sends a signal to a length measuring device to cause it to record the position of the probe as $p_1$;

4), a controller causes the probe to move in a direction opposite to the measuring direction;

5); the probe is checked to see if it is in positive contact with the other side of the micro-cavity in the opposite direction, if the probe is not in positive contact with the other side of the micro-cavity, the measuring process starts from step 4 again;

6), when the probe is in positive contact with the other side of the micro-cavity, the sight and transmitter sends a signal to the length measuring device to cause it to record the position of the probe as $p_2$;

7), the dimensions of the micro-cavity can be calculated using formula $L=|p_1-p_2|+d_0$, where $d_0$ is the diameter of the sensor probe.

9. The micro-cavity measuring method of claim 8, wherein if measuring a micro-hole, repeat the steps 6 and 7 several times to get $\Delta_{max}$=maximum $|p_1-p_2|$ for the diameter of the micro-hole.

10. The micro-cavity measuring method of claim 9, wherein the $\Delta_{max}$ can be obtained through the following steps:

1) the probe is inserted into one cross-section of the micro-hole, and the sight and transmitter sends a start signal to the length measuring device to cause it to start working and record the position of the probe as $p_1$ when the probe is in positive contact with one side of the micro-hole;

2) then the controller causes the probe to move to the other side of the micro-hole in the measuring direction, and the sight and transmitter sends a stop signal to the length measuring device to cause it to stop working and record the position of the probe as $p_{21}$ when the probe is in positive contact with the other side;

3) the relative displacement between the probe and the micro-hole can be calculated using formula $\Delta_1=|p_1-p_{21}|$;

4) the micro-hole is moved in a direction vertical to the measuring direction in the plane being measured, and the probe is then moved to achieve a positive contact with the micro-hole, and the sight and transmitter sends a stop signal to the length measuring device to cause it to stop working and record the position of the probe as $p_{22}$;

5) the relative displacement between the probe and the micro-hole can be calculated using formula $\Delta_2=|p_1-p_{22}|$;

6) the measuring process will be continued until maximum $\Delta_{max}$ is obtained, and the diameter of the micro-hole is calculated using formula $d=\Delta_{max}+d_0$.

* * * * *